(12) United States Patent
Gui et al.

(10) Patent No.: US 10,990,836 B2
(45) Date of Patent: Apr. 27, 2021

(54) METHOD AND APPARATUS FOR RECOGNIZING OBJECT, DEVICE, VEHICLE AND MEDIUM

(71) Applicant: BAIDU ONLINE NETWORK TECHNOLOGY (BEIJING) CO., LTD., Beijing (CN)

(72) Inventors: Yilin Gui, Beijing (CN); Han Gao, Beijing (CN); Qi Li, Beijing (CN); Tian Xia, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/556,846

(22) Filed: Aug. 30, 2019

(65) Prior Publication Data
US 2020/0074196 A1 Mar. 5, 2020

(30) Foreign Application Priority Data

Aug. 30, 2018 (CN) .......................... 201811004517.2

(51) Int. Cl.
*H04N 5/247* (2006.01)
*G06T 7/70* (2017.01)
*G06K 9/00* (2006.01)

(52) U.S. Cl.
CPC ............ *G06K 9/00825* (2013.01); *G06T 7/70* (2017.01); *H04N 5/247* (2013.01); *G06T 2207/30252* (2013.01)

(58) Field of Classification Search
CPC ....................................................... G06T 7/70
See application file for complete search history.

(56) References Cited

U.S. PATENT DOCUMENTS

| | | | | |
|---|---|---|---|---|
| 9,269,146 | B2 * | 2/2016 | Khawand | G06T 7/70 |
| 9,449,258 | B1 * | 9/2016 | Palacio | H04N 5/247 |
| 9,868,449 | B1 * | 1/2018 | Holz | G06K 9/00355 |
| 10,628,673 | B2 * | 4/2020 | Wnuk | G06F 16/583 |
| 10,643,342 | B2 * | 5/2020 | Dong | H04N 13/246 |

(Continued)

FOREIGN PATENT DOCUMENTS

| | | |
|---|---|---|
| CN | 107590461 A | 1/2018 |
| CN | 107613200 A | 1/2018 |

(Continued)

OTHER PUBLICATIONS

Office Action for Chinese Application No. 201811004517.2, dated May 7, 2020, 18 pages.

(Continued)

*Primary Examiner* — Irfan Habib
(74) *Attorney, Agent, or Firm* — Fay Sharpe LLP (57) ABSTRACT

Embodiments of the present disclosure provide a method and an apparatus for recognizing an object, a device, a vehicle and a medium. The method includes: selecting a target camera matched with a target object from at least two cameras according to position information of the target object in a map and photographing parameters of the at least two cameras, in which, the at least two cameras has at least two focal lengths; controlling the target camera to photograph an image of the target object; and obtaining the image photographed by the target camera, and performing recognition on the image to recognize the target object.

12 Claims, 3 Drawing Sheets

(56) References Cited

U.S. PATENT DOCUMENTS

| | | | | |
|---|---|---|---|---|
| 2008/0278589 A1* | 11/2008 | Thorn | ............... | H04N 5/232945 |
| | | | | 348/208.14 |
| 2009/0103779 A1* | 4/2009 | Loehlein | ................ | G06K 9/629 |
| | | | | 382/103 |
| 2015/0003669 A1* | 1/2015 | Solgi | ..................... | G06K 9/3241 |
| | | | | 382/103 |
| 2017/0277952 A1* | 9/2017 | Thommes | ................ | G06T 7/143 |
| 2018/0165519 A1* | 6/2018 | Wnuk | ................... | G06K 9/6202 |
| 2018/0365888 A1* | 12/2018 | Satzoda | ................ | G06N 3/0454 |
| 2019/0244378 A1* | 8/2019 | Dong | ..................... | H04N 5/247 |
| 2020/0064483 A1* | 2/2020 | Li | ........................... | G01S 17/87 |
| 2020/0218913 A1* | 7/2020 | Unnikrishnan | ....... | G06K 9/6218 |

FOREIGN PATENT DOCUMENTS

| | | | |
|---|---|---|---|
| CN | 207523551 U | | 6/2018 |
| CN | 108305475 | * | 7/2018 |
| CN | 108366207 A | | 8/2018 |
| CN | 108401496 | * | 8/2018 |
| CN | 108401496 A | | 8/2018 |
| JP | 2003-028654 A | | 1/2003 |
| JP | 2011-123548 A | | 6/2011 |
| JP | 2016-522415 A | | 7/2016 |
| JP | 2018-510373 A | | 4/2018 |
| WO | 2017/002471 A | | 1/2017 |

OTHER PUBLICATIONS

Extended European Search Report for Application No. 19194552.6, dated Jan. 8, 2020, 7 pages.

Office Action for Japanese application No. 2019-156514, dated Nov. 4, 2020, 4 pages.

Translation of Office Action for Japanese application No. 2019-156514, dated Nov. 4, 2020, 5 pages.

* cited by examiner

METHOD AND APPARATUS FOR RECOGNIZING OBJECT, DEVICE, VEHICLE AND MEDIUM

CROSS-REFERENCE TO RELATED APPLICATION

This application claims priority to and benefits of Chinese Patent Application Serial No. 201811004517.2, filed with the State Intellectual Property Office of P. R. China on Aug. 30, 2018, the entire content of which is incorporated herein by reference.

FIELD

Embodiments of the present disclosure relates to a field of imaging processing technologies, and more particularly to a method and an apparatus for recognizing an object, a device, a vehicle, and a medium.

BACKGROUND

Driverless technology is a technology that has developed rapidly in recent years. The general technical framework of the technology is that, a driverless system is installed in a vehicle to perform sense recognition on external environment, thus controlling the vehicle during the driving process of the vehicle. Therefore, a driverless sense system in the driverless system is an important function system. Generally, a plurality of sense apparatuses may be installed in the vehicle, such as a laser radar, a plurality of cameras, various sensors and the like. The method of collecting an image through the camera and performing the sense recognition on the external environment of the vehicle based on image recognition is one of important sense manners.

Various objects in the external environment may be detected by utilizing image sense recognition, typically such as, a traffic sign, a change in the signal lights at a crossroad, or the like. For the signal lights at the crossroad, since a road condition at the crossroad is complex, a plurality of signal lights may be provided on one side, such as a left turning light, a straight light, and a pedestrian light, at the like.

SUMMARY

Embodiments of the present disclosure provide a method for recognizing an object. The method includes:

selecting a target camera matched with a target object from at least two cameras according to position information of the target object in a map and photographing parameters of the at least two cameras, in which, the at least two cameras has at least two focal lengths;

controlling the target camera to photograph an image of the target object; and obtaining the image photographed by the target camera, and performing recognition on the image to recognize the target object.

Embodiments of the present disclosure also provide an apparatus for recognizing an object.

The device includes: a selection module, a photographing module and an image obtaining and recognition module.

The selection module is configured to select a target camera matched with a target object from at least two cameras according to position information of the target object in a map and photographing parameters of the at least two cameras. The at least two cameras employs at least two focal lengths.

The photographing module is configured to control the target camera to photograph an image of the target object.

The image obtaining and recognition module is configured to obtain the image photographed by the target camera, and to perform recognition on the image to recognize the target object.

In a third aspect, embodiments of the present disclosure also provide a device. The device includes a memory, a processor and a computer program stored in the memory and executable in the processor. When the computer program is executed by the processor, the method for recognizing the object according to any of embodiments of the present disclosure is implemented.

Embodiments of the present disclosure also provide a vehicle. The vehicle includes a vehicle body, the device according to any of embodiments of the present disclosure, and at least two cameras disposed on the vehicle body. Each of the at least two cameras employs a focal length.

Embodiments of the present disclosure also provide a computer readable storage medium having a computer program stored thereon. The method for recognizing the object according to any of embodiments of the present disclosure is implemented when the computer program is executed by a processor.

DETAILED DESCRIPTION

Detailed description will be further made below to the present disclosure with reference to the accompanying drawings and the embodiments. It should be understood that, detailed embodiments described herein are merely intended to explain the present disclosure, and are not intended to limit the present disclosure. In addition, it should be further noted that, for the convenience of description, only some contents but not all of the structure related to the present disclosure are illustrated in the accompanying drawings.

When the image recognition is performed, there may be a problem of limitation in field of view caused by using a camera with a single focal length. It is difficult for the camera with the single focal length to photograph an image covering all the signal lights, thus causing that detection information of the signal lights is not complete, even cannot be detected. Thus embodiments of the present disclosure provide a method and an apparatus for recognizing an object, a device, a vehicle, and a medium.

Figure 1:
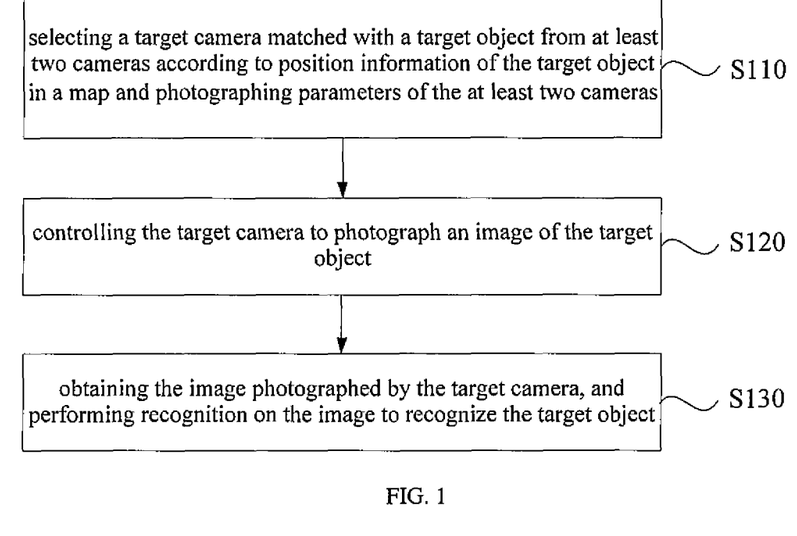
FIG. 1 is a flow chart illustrating a method for recognizing an object according to an embodiment of the present disclosure.

FIG. 1 is a flow chart illustrating a method for recognizing an object according to an embodiment of the present disclosure. This embodiment may be applied to a condition of detecting a signal light via an in-vehicle camera, and more particularly to a condition of detecting the signal light via an in-vehicle camera of a driverless vehicle. Certainly, this embodiment may also be applied to a condition for detecting other objects. The method may be executed by an apparatus for recognizing an object provided by embodiments of the present disclosure. The apparatus may be implemented in a form of software and/or hardware, and may be generally integrated in an in-vehicle device, such as a control device of the driverless vehicle. As illustrated in FIG. 1, the method of this embodiment includes following actions.

At block S110, a target camera matched with a target object is selected from at least two cameras according to position information of the target object in a map and photographing parameters of the at least two cameras. The at least two cameras has at least two focal lengths.

In detail, the target object may be a fixed object or an object moving with a low frequency. The camera is installed in a moving object.

In this embodiment, the target object is a signal light, such as a left turning light, a straight light, a pedestrian light, and the like. The position information of the signal light in the map may be position data of the signal light obtained by a positioning system. The cameras are cameras installed in a vehicle, and more particularly cameras installed in the driverless vehicle.

The position information of the signal light may be determined by position information of the vehicle installed with the cameras. Alternatively, before selecting the target camera matched with the target object from the at least two cameras, the method further includes follows. A position of the vehicle, in which, the at least two cameras are installed in the vehicle. In response to determining that the vehicle locates at a crossroad according to the position of the vehicle, three-dimensional position information of a signal light at the crossroad is obtained from map data as the position information of the target object.

In detail, the position of the vehicle may be obtained by a positioning module in a navigation system in the vehicle, such as, a global positioning system module. It may be determined whether the camera installed in the vehicle will pass the crossroad according to the position of the vehicle, thus determining the signal light to be recognized when the vehicle locates at the crossroad. Since there may be a plurality of signal lights at the crossroad, the three-dimensional position information corresponding to respective signal lights may be obtained. The signal lights are selected one by one as the target object, and the corresponding three-dimensional position information is obtained.

By obtaining the three-dimensional position information of the signal light at the crossroad when it is determined that the vehicle is at the crossroad according to the position of the vehicle where the camera locates, the position of the signal light may be determined accurately, so as to further select the camera according to the position of the signal light, thus determining an appropriate camera for photographing the signal light.

The camera in the vehicle generally photographs the signal light during driving process of the vehicle. At this time, neither the photographing angle nor the photographing range has a standard data. When a camera with a single focal length is employed, the photographing range is narrow, and may not cover the signal lights. The signal lights may be covered when the signal lights are photographed respectively by employing a plurality of cameras with different focal lengths. However, in this case, signal light recognition may be performed on a plurality of photographed images, with a great amount of data to be recognized, thus recognition efficiency is low, and some photographed images have poor quality, which result in larger errors in recognition. In response to the above case, in this embodiment, a plurality of cameras are disposed in the vehicle, focal lengths of the plurality of cameras are different, and a camera with an appropriate focal length is selected for each signal light according to the photographing parameters of respective cameras and the position information of respective signal lights. Thus, an appropriate camera is selected for the signal light for photographing, adapting different driving road conditions, not only ensuring that the photographed image can cover the signal lights completely, but also ensuring that the photographed image is clear.

At block S120, the target camera is controlled to photograph an image of the target object.

The image of the target object may be photographed by employing the selected target camera. During a detailed implementation process, the target camera is controlled to collecting preview images firstly, then the target camera is selected, and finally photographing of the target camera is started up. Alternatively, all the cameras may be controlled to perform image photographing firstly, that is, both the target camera and other cameras are controlled to perform the image photographing, and then the target camera is selected from all the cameras. Therefore, an order for executing the above actions at blocks S110 and S120 is not limited.

At block S130, the image photographed by the target camera is obtained, and recognition is performed on the image to recognize the target object.

A type of the signal light, such as a pedestrian light, a direction indicator light, a driveway signal light, a bicycle lane signal light, or the like, may be determined based on color and shape of the signal light in the obtained image. Instruction information of the signal light may further be obtained according to the color and the shape of the signal light, and time information. For example, red represents no passing, green represents opening to traffic, yellow represents warning, a pedestrian image represents that the signal light is configured to represent an instruction signal of a walkway, and a digital image represents a time period between a current time and a time when the signal light changes.

With embodiments of the present disclosure, the target camera capable of photographing the target object clearly according to the position information of the target object and the photographing parameters of a plurality of cameras which have different focal lengths, and photographing is performed on the target object, thereby, target object recognition is performed according to the photographed image, the problem in the related art that a signal light may be detected to be incompletely or even may not be detected resulting from a photographing range of a camera with a single focal length which is hard to cover all the signal lights is solved. An appropriate camera for respective signal light may be selected correspondingly, such that the obtained image may cover all the signal lights, avoiding a limitation of field of view, as well as ensuring image definition may be ensured, thus implementing accurate detection of the signal light.

Figure 2:
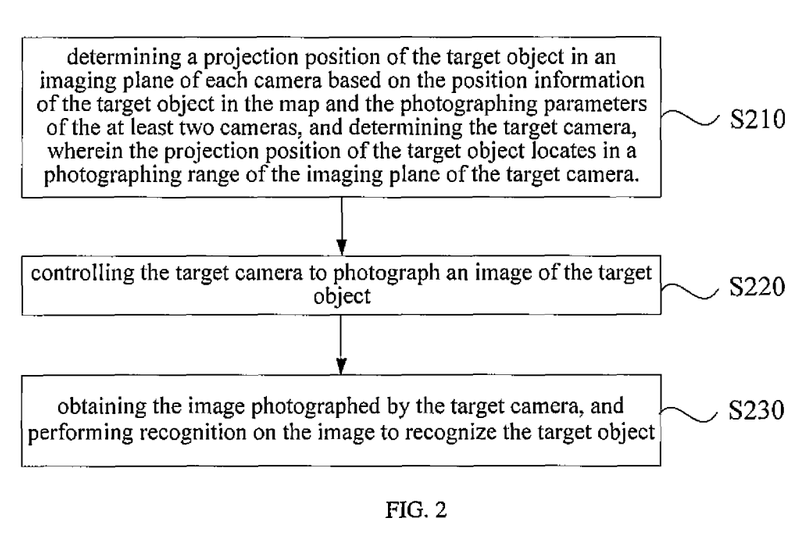
FIG. 2 is a flow chart illustrating a method for recognizing an object according to an embodiment of the present disclosure.

FIG. 2 is a flow chart illustrating a method for recognizing according to an embodiment of the present disclosure. In detail, selecting the target camera matched with the target object from the at least two cameras according to the position information of the target object in the map and the photographing parameters of the at least two cameras includes: determining a projection position of the target object in an imaging plane of each camera based on the position information of the target object in the map and the photographing parameters of the at least two cameras, and determining the target camera. The projection position of the target object locates in a photographing range of the imaging plane of the target camera.

Referring to FIG. 2, the method may include following actions.

At block S210, the projection position of the target object in the imaging plane of each camera is determined based on the position information of the target object in the map and the photographing parameters of the at least two cameras, and the target camera is determined, in which, the projection position of the target object locates in a photographing range of the imaging plane of the target camera. The at least two cameras has at least two focal lengths.

The target object, the position information and the photographing parameters may refer to description in the above embodiment. The photographing parameter of a camera may include: an internal parameter and an external parameter. The internal parameter may include: the focal length, an optical center, and a distortion coefficient. The external parameter may include: a transformation matrix from a world coordinate system to a camera coordinate system.

Figure 3:
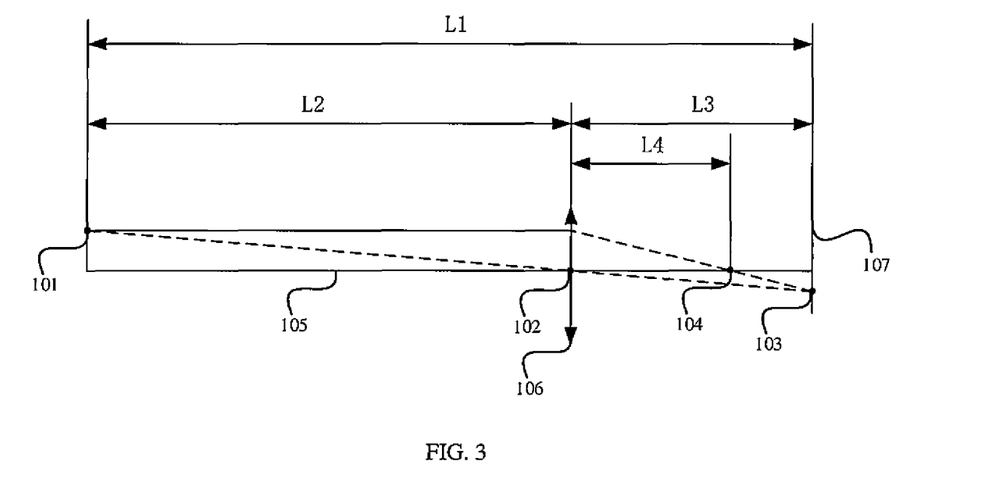
FIG. 3 is a schematic diagram illustrating principle of camera imaging according to an embodiment of the present disclosure.

In detail, FIG. 3 is a schematic diagram of a camera imaging according to an embodiment of the present disclosure. As illustrated in FIG. 3, an imaging point 103 formed through a thin lens 102 by a photographed point 101 is on a photoreception plane 107. An optical axis 105 is a straight line passing through spherical centers of two aspherical surfaces of the thin lens 102. An optical center 102 is a point which locates in the optical axis of the thin lens 102 and where a propagation direction does not change when an incident light passes through. A photographing distance L1 is a distance between the photographed point 101 and the photoreception plane 107. An object distance L2 is a distance between the photographed point 101 and a plane where the thin lens 102 locates. An image distance L3 is a distance between the photoreception plane 107 and the plane where the thin lens 102 locates. A focal length L4 is a distance between a focus 104 and the plane where the thin lens 102 locates.

The target object is imaged though the thin lens. Distortion may occur in a virtual image due to optical property of the thin lens. The distortion is an inherent perspective distortion of an optical lens. A distortion coefficient is a parameter for correcting a distorted image. The world coordinate system may be an absolute coordinate system. In this embodiment, the world coordinate system may be a coordinate system in the map. A camera coordinate system may be a coordinate system established using the camera as a base. Camera coordinate systems of respective cameras are different with each other. The target camera needs to be determined from a plurality of cameras. The cameras need to perform preview imaging on the target object respectively. In fact, the images photographed by respective cameras are in the camera coordinate systems corresponding to respective cameras. When analysis is performed on an image, the obtained position information of the target object is position information in the world coordinate system. Therefore, there is a need to transform the position information from the world coordinate system to a corresponding camera coordinate system. The position information may be transformed according to a transformation matrix from the world coordinate system to the camera coordinate systems respectively, to obtain position information in each camera coordinate system. The above transformation matrix from the world coordinate system to the camera coordinate system may be obtained according to the location information of the driverless vehicle (that is, position information of a location device) and a transformation matrix from the camera to the location device. The position information of the vehicle is actually the position information of the location device in the vehicle, and a position of the location device is different from a position of the camera. Therefore, there is a need to determine the transformation matrix from the world coordinate system to the camera coordinate system according to the location information (that is, the position information of the location device) and a transformation matrix from the camera to the location device. The location information of the driverless vehicle may be changed along with the position of the vehicle in real time. The location device is stationary relative to the camera in the driverless vehicle. In other words, a transformation parameter from the camera to the location device is fixed.

The imaging plane may refer to the photoreception plane 107 illustrated in FIG. 3. It may be considered that the target object is composed of a plurality of points. Each point may refer to the photographed point 101 illustrated in FIG. 3. It may be considered that a real image of the target object in the imaging plane is composed of a plurality of image points. Each image point may refer to the imaging point 103 illustrated in FIG. 3. The target object is a three-dimensional object, and the imaging plane is a two-dimensional plane. In fact the real image corresponding to the target object is three-dimensional, and the real image may be projected to form a two-dimensional image in the imaging plane. When a projection position of the two-dimensional image corresponding to the target object locates the photographing range of the imaging plane of a camera, that is, when the photographing range of the camera may entirely cover the two-dimensional image corresponding to the target object, it is determined that the target object may be photographed by the camera, such that the camera is the target camera selected for the target object.

In detail, a method for projecting the target object to the two-dimensional plane may refer to following equations.

Firstly, it is assumed that a world coordinate of a three-dimensional point is $P_w$, and $$P_w = (X_w, Y_w, Z_w).$$

An external parameter of the camera is:

$$T = \begin{bmatrix} R & t \\ 0^T & 1 \end{bmatrix},$$

where, R is a rotation matrix, and t is a translation vector.
An Internal parameter of the camera is:

$$K = \begin{bmatrix} f_x & 0 & c_x \\ 0 & f_y & c_y \\ 0 & 0 & 1 \end{bmatrix},$$

where, $f_x$ and $f_y$ are focal lengths with a pixel as an unity, and $(c_x, c_y)$ is a position coordinate of a principal point of the camera.

An equation for projecting the three-dimensional point to a two-dimensional point in the imaging plane (a photographed image) is as follows.

$$\begin{bmatrix} \mu \\ v \\ 1 \end{bmatrix} = \begin{bmatrix} f_x & 0 & c_x & 0 \\ 0 & f_y & c_y & 0 \\ 0 & 0 & 1 & 0 \end{bmatrix} \begin{bmatrix} R & t \\ 0^T & 1 \end{bmatrix} \begin{bmatrix} X_w \\ Y_w \\ Z_w \\ 1 \end{bmatrix}$$

Where, ($\mu$, v) is a pixel coordinate in a plane of the photographed image. A width of an image is set as w. A height of the image is set as h. When $0<=\mu<w$ and $0<=v<h$, it is determined that the three-dimensional point is able to be projected to the image, that is, the target object may be completely photographed by the camera.

Alternatively, determining the projection position of the target object in the imaging plane of each camera based on the position information of the target object in the map and the photographing parameters of the at least two cameras, and determining the target camera include: selecting a camera as a current camera to be selected according to an ascending order of the focal lengths of the at least two cameras successively; determining a projection position of the target object in an imaging plane of the current camera to be selected based on the position information of the target object in the map and a photographing parameter of the current camera to be selected; and in response to determining that the projection position of the target object locates in the photographing range of the imaging plane of the current camera to be selected, determining the current camera to be selected as the target camera.

In this embodiment, respective cameras have different focal lengths, and it may be determined whether a camera is the target camera corresponding to the target object according to the ascending order of the focal lengths. With the same photographing distance, the smaller the focal length, the larger the imaging range corresponding to the target object is, and the imaging range may extend the photographing range of the camera. Therefore, the cameras are determined one-by-one in the ascending order of the focal lengths. When a first target camera which may photograph an entire target object is selected from the cameras, the subsequent cameras with lager focal lengths do not need to be determined. Selecting the first target camera to photograph the target object may be beneficial to object recognition and a clear image of the target object may be obtained.

Certainly, the number of the target cameras is not limited to one. Alternatively, the target camera may be replaced after the image recognition fails.

By determining the target camera in the ascending order of the focal lengths of cameras, determination for all the cameras may be avoided, improving efficiency for selecting the target camera.

Alternatively, after determining the current camera to be selected as the target camera, the method further includes: stopping determination operation of the target camera. The finally determined the target camera is a camera which may entirely photograph an image of the target object, that is, the image photographed by the target camera may cover the target object.

In detail, after determining the current camera to be selected as the target camera, there is no need to perform determination on the subsequent cameras. The current camera to be selected is determined as the target camera. In this way, the determined target camera may realize that the photographed image of the target object is capable to cover the target object, and the target object is the largest in the imaging range of the photographed image, that is, the current camera is a camera that photographs the clearest image of the target object, thus improving the definition of the photographed image of the target object and increasing the recognition accuracy of the target object.

At block S220, the target camera is controlled to photograph an image of the target object.

After determining the target object, the target camera is controlled to photograph, to obtain a preferred photographed image of the target object.

At block S230, the image photographed by the target camera is obtained, and recognition is performed on the image to recognize the target object.

The recognition is performed based on the preferred photographed image, to further improve the accuracy of recognition.

With embodiments of the present disclosure, the target camera is determined based on the position information of the target object and the photographing parameter of the camera, in which, the projection position of the target object locates in the photographing range of the imaging plane of the target camera, implementing that the target camera photographs the entire image of the target object, such that the target object may be recognized accurately.

Figure 4:
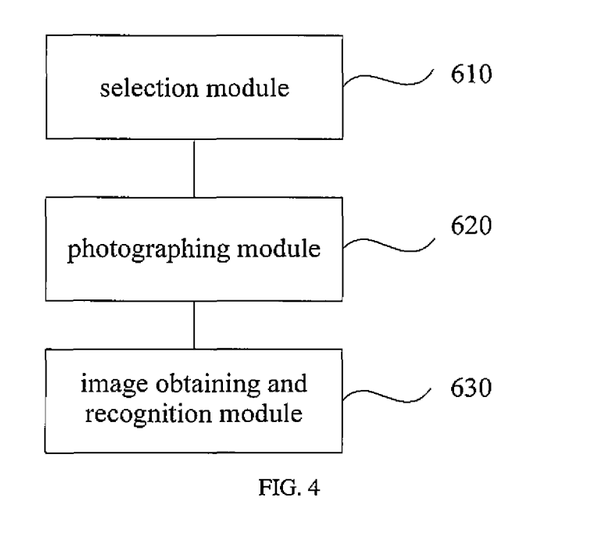
FIG. 4 is a block diagram illustrating an apparatus for recognizing an object according to an embodiment of the present disclosure.

FIG. 4 is a block diagram illustrating an apparatus for recognizing an object according to an embodiment of the present disclosure. The apparatus for recognizing an object is disposed on an in-vehicle device. As illustrated in FIG. 4, the apparatus includes: a selection module 310, a photographing module 320 and an image obtaining and recognition module 330.

The selection module 310 is configured to select a target camera matched with a target object from at least two cameras according to position information of the target object in a map and photographing parameters of the at least two cameras. The at least two cameras employs at least two focal lengths.

The photographing module 320 is configured to control the target camera to photograph an image of the target object.

The image obtaining and recognition module 330 is configured to obtain the image photographed by the target camera, and perform recognition on the image to recognize the target object.

With embodiments of the present disclosure, the target camera capable of photographing the target object clearly according to the position information of the target object and the photographing parameters of a plurality of cameras which have different focal lengths, and photographing is performed on the target object, thereby, target object recognition is performed according to the photographed image, the problem in the related art that a signal light may be detected to be incompletely or even may not be detected resulting from a photographing range of a camera with a single focal length which is hard to cover all the signal lights is solved. An appropriate camera for respective signal light may be selected correspondingly, such that the obtained image may cover all the signal lights, avoiding a limitation of field of view, as well as ensuring image definition may be ensured, thus implementing accurate detection of the signal light.

Further, the selection module 310 is configured to determine a projection position of the target object in an imaging plane of each camera based on the position information of the target object in the map and the photographing parameters of the at least two cameras, and determine the target camera, in which the projection position of the target object locates in a photographing range of the imaging plane of the target camera.

Further, the selection module 310 is configured to select a camera as a current camera to be selected according to an ascending order of the focal lengths of the at least two cameras successively, determine a projection position of the target object in an imaging plane of the current camera to be selected based on the position information of the target object in the map and a photographing parameter of the current camera to be selected, and determine the current camera to be selected as the target camera in response to determining that the projection position of the target object locates in the photographing range of the imaging plane of the current camera to be selected.

Further, the apparatus is configured to stop determination operation of the target camera.

Further, the photographing parameters include: an internal parameter and an external parameter. The internal parameter includes: the focal length, an optical center, and a distortion coefficient. The external parameter includes: a transformation matrix from a world coordinate system to a camera coordinate system.

Further, the apparatus is configured to obtain a position of a vehicle, in which, the at least two cameras are installed on the vehicle, and in response to determining that the vehicle locates at a crossroad according to the position of the vehicle, obtain three-dimensional position information of a signal light at the crossroad from map data as the position information of the target object.

The above apparatus for recognizing an object may execute the method for recognizing an object provided by any of embodiments of the present disclosure, which have corresponding function modules and beneficial effect of the method for recognizing an object.

Figure 5:
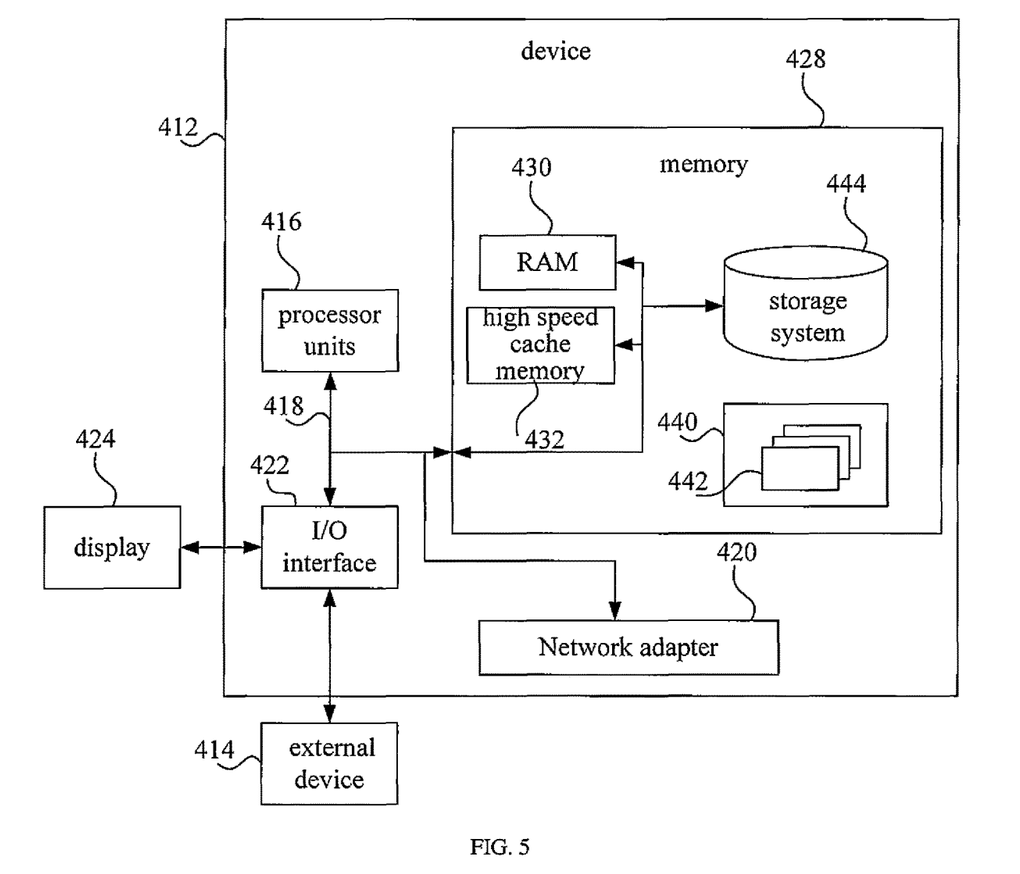
FIG. 5 is a block diagram illustrating a device according to an embodiment of the present disclosure.

FIG. 5 is a block diagram illustrating a device according to an embodiment of the present disclosure. FIG. 5 illustrates a block diagram of an exemplary device 412 applicable to implement embodiments of the present disclosure. The device 412 illustrated in FIG. 5 is only an example, which may not bring any limitation to functions and range of embodiments of the present disclosure.

As illustrated in FIG. 5, the device 412 is embodied in the form of a general-purpose computer device. Components of the device 412 may include but not limited to: one or more processors or processing units 416, a system memory 428, and a bus 418 connecting different system components (including the system memory 428 and the processing unit 416). The device 412 may be a vehicle device.

The bus 418 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The device 412 typically includes various computer system readable mediums. These mediums may be any usable medium that may be accessed by the server 412, including volatile and non-volatile mediums, removable and non-removable mediums.

The system memory 428 may include computer system readable mediums in the form of volatile medium, such as a RAM (Random Access Memory) 430 and/or a cache memory 432. The device 412 may further include other removable/non-removable, volatile/non-volatile computer system storage mediums. Only as an example, the storage system 444 may be configured to read from and write to non-removable, non-volatile magnetic mediums (not illustrated in FIG. 5, and usually called "a hard disk driver"). Although not illustrated in FIG. 5, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 418 by one or more data medium interfaces. The system memory 428 may include at least one program product. The program product has a set of program modules (for example, at least one program module), and these program modules are configured to execute functions of respective embodiments of the present disclosure.

A program/utility tool 440, having a set (at least one) of program modules 442, may be stored in the system memory 428. Such program modules 442 include but not limited to an operating system, one or more application programs, other program modules, and program data. Each or any combination of these examples may include an implementation of a networking environment. The program module 442 usually executes functions and/or methods described in embodiments of the present disclosure.

The device 412 may communicate with one or more external devices 414 (such as a keyboard, a pointing device, and a display 424), may further communicate with one or more devices enabling a user to interact with the device 412, and/or may communicate with any device (such as a network card, and a modem) enabling the device 412 to communicate with one or more other computer devices. Such communication may occur via an Input/Output (I/O) interface 422. Moreover, the device 412 may further communicate with one or more networks (such as LAN (Local Area Network), WAN (Wide Area Network) and/or public network, such as Internet) via a network adapter 420. As illustrated in FIG. 5, the network adapter 420 communicates with other modules of the device 412 via the bus 418. It should be understood that, although not illustrated in FIG. 5, other hardware and/or software modules may be used in combination with the server 412, including but not limited to: microcode, device drivers, redundant processing units, external disk drive arrays, RAID (Redundant Array of Independent Disks) systems, tape drives, and data backup storage systems, etc.

The processor 416, by operating programs stored in the system memory 428, executes various function applications and data processing, for example implements a method for recognizing an object provided in embodiments of the present disclosure.

The processor 416, executing the programs, implements: selecting a target camera matched with a target object from at least two cameras according to position information of the target object in a map and photographing parameters of the at least two cameras, in which, the at least two cameras has at least two focal lengths, controlling the target camera to photograph an image of the target object, obtaining the image photographed by the target camera, and performing recognition on the image to recognize the target object.

Embodiments of the present disclosure may further provide a vehicle. The vehicle at least includes a vehicle body, a device provided by any embodiment of the present disclosure, and at least two cameras disposed on the vehicle body. Each of the at least two cameras employs a focal length. The device may be an in-vehicle control device in the vehicle body. In some embodiments, the vehicle may be a driverless driving vehicle, or may also be other vehicle which needs to perform an object recognition in an environment surrounding the vehicle.

Embodiments of the present disclosure provide a computer readable storage medium having a computer program stored thereon. When executed by a processor, the computer program is configured to cause the processor to implement a method for recognizing an object according to any of embodiments of the present disclosure. The method includes: selecting a target camera matched with a target object from at least two cameras according to position information of the target object in a map and photographing parameters of the at least two cameras, in which, the at least two cameras has at least two focal lengths; controlling the target camera to photograph an image of the target object; and obtaining the image photographed by the target camera, and performing recognition on the image to recognize the target object.

The computer storage medium in embodiments of the present disclosure may employ any combination of one or more computer readable mediums. The computer readable medium may be a computer readable signal medium or a computer readable storage medium. The computer readable storage medium may be, for example, but not limited to an electronic, magnetic, optical, electromagnetic, infrared, or semiconductor system, apparatus or device, or any suitable combination of the foregoing. More specific examples (a non-exhaustive list) of the computer-readable storage medium may include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical memory device, a magnetic memory device, or any appropriate combination of the foregoing. In this document, the computer readable storage medium can be any tangible medium that contains or stores a program. The program can be used by or in conjunction with an instruction execution system, apparatus or device.

The computer readable signal medium may include a data signal transmitted in the baseband or as part of a carrier, in which computer readable program codes are carried. The transmitted data signal may employ a plurality of forms, including but not limited to an electromagnetic signal, a light signal or any suitable combination thereof. The computer readable signal medium may further be any computer readable medium other than the computer readable storage medium. The computer readable medium may send, propagate or transmit programs configured to be used by or in combination with an instruction execution system, apparatus or device.

The program codes included in the computer readable medium may be transmitted by any appropriate medium, including but not limited to wireless, electric wire, optical cable, RF (Radio Frequency), or any suitable combination of the foregoing.

The computer program codes for executing operations of the present disclosure may be programmed using one or more programming languages or the combination thereof. The programming languages include object-oriented programming languages, such as Java, Smalltalk, C++, and further include conventional procedural programming languages, such as the C programming language or similar programming languages. The program codes may be executed entirely on a user computer, partly on the user computer, as a stand-alone software package, partly on the user computer and partly on a remote computer, or entirely on the remote computer or server. In the scenario involving the remote computer, the remote computer may be connected to the user computer through any type of network, including a local area network (LAN) or a wide area network (WAN), or may be connected to an external computer (for example, through the Internet using an Internet Service Provider).

The above is merely a preferred embodiment of the present disclosure and an operated technical principle. Those skilled in the art should understand that, the present disclosure does not limit to the specific embodiment described herein. Those skilled in the art may make various obvious changes, alternatives, and modifications and may not depart from the protection range of the present disclosure. Therefore, although a more detailed description has been made to the present disclosure by the above embodiments, the present disclosure is not merely limited to the above embodiments. More equivalent embodiments may also be included without departing from the technical idea of the present disclosure. The range of the present disclosure may be determined by a range of the appended claims.

What is claimed is:

1. A method for recognizing an object, comprising:

selecting a target camera matched with a target object from at least two cameras according to position information of the target object in a map and photographing parameters of the at least two cameras, wherein, the at least two cameras has at least two focal lengths;

controlling the target camera to photograph an image of the target object; and obtaining the image photographed by the target camera, and performing recognition on the image to recognize the target object;

wherein, selecting the target camera matched with the target object from the at least two cameras according to position information of the target object in the map and photographing parameters of the at least two cameras comprises:

determining a projection position of the target object in an imaging plane of each camera based on the position information of the target object in the map and the photographing parameters of the at least two cameras, and determining the target camera, wherein the projection position of the target object locates in a photographing range of the imaging plane of the target camera;

wherein, determining the projection position of the target object in the imaging plane of each camera based on the position information of the target object in the map and the photographing parameters of the at least two cameras, and determining the target camera comprise:

selecting a camera as a current camera to be selected according to an ascending order of the focal lengths of the at least two cameras successively;

determining a projection position of the target object in an imaging plane of the current camera to be selected based on the position information of the target object in the map and a photographing parameter of the current camera to be selected; and in response to determining that the projection position of the target object locates in the photographing range of the imaging plane of the current camera to be selected, determining the current camera to be selected as the target camera.

2. The method according to claim 1, after determining the current camera to be selected as the target camera, further comprising: stopping determination operation of the target camera.

3. The method according to claim 1, wherein, the photographing parameters comprises:
an internal parameter, comprising: the focal length, an optical center, and a distortion coefficient; and
an external parameter, comprising: a transformation matrix from a world coordinate system to a camera coordinate system.

4. The method according to claim 1, before selecting the target camera matched with the target object from the at least two cameras, further comprising:
obtaining a position of a vehicle, wherein, the at least two cameras are installed on the vehicle; and
in response to determining that the vehicle locates at a crossroad according to the position of the vehicle, obtaining three-dimensional position information of a signal light at the crossroad from map data as the position information of the target object.

5. A device, comprising:
one or more processors, and
a storage device, configured to store one or more programs that, when executed by the one or more processors, cause the one or more processors to implement a method for recognizing an object, the method comprising:
selecting a target camera matched with a target object from at least two cameras according to position information of the target object in a map and photographing parameters of the at least two cameras, wherein, the at least two cameras has at least two focal lengths;
controlling the target camera to photograph an image of the target object; and
obtaining the image photographed by the target camera, and performing recognition on the image to recognize the target object;
wherein, selecting the target camera matched with the target object from the at least two cameras according to position information of the target object in the map and photographing parameters of the at least two cameras comprises:
determining a projection position of the target object in an imaging plane of each camera based on the position information of the target object in the map and the photographing parameters of the at least two cameras, and determining the target camera, wherein the projection position of the target object locates in a photographing range of the imaging plane of the target camera;
wherein, determining the projection position of the target object in the imaging plane of each camera based on the position information of the target object in the map and the photographing parameters of the at least two cameras, and determining the target camera comprise:
selecting a camera as a current camera to be selected according to an ascending order of the focal lengths of the at least two cameras successively;
determining a projection position of the target object in an imaging plane of the current camera to be selected based on the position information of the target object in the map and a photographing parameter of the current camera to be selected; and
in response to determining that the projection position of the target object locates in the photographing range of the imaging plane of the current camera to be selected, determining the current camera to be selected as the target camera.

6. The device according to claim 5, wherein, after determining the current camera to be selected as the target camera, the method further comprises: stopping determination operation of the target camera.

7. The device according to claim 5, wherein, the photographing parameters comprises:
an internal parameter, comprising: the focal length, an optical center, and a distortion coefficient; and
an external parameter, comprising: a transformation matrix from a world coordinate system to a camera coordinate system.

8. The device according to claim 5, wherein before selecting the target camera matched with the target object from the at least two cameras, the method further comprises:
obtaining a position of a vehicle, wherein, the at least two cameras are installed on the vehicle; and
in response to determining that the vehicle locates at a crossroad according to the position of the vehicle, obtaining three-dimensional position information of a signal light at the crossroad from map data as the position information of the target object.

9. A vehicle, comprising: a vehicle body, a device, and at least two cameras disposed on the vehicle body, wherein, each of the at least two cameras employs a focal length, and the device comprises:
one or more processors, and
a storage device, configured to store one or more programs that, when executed by the one or more processors, cause the one or more processors to implement a method for recognizing an object, the method comprising:
selecting a target camera matched with a target object from at least two cameras according to position information of the target object in a map and photographing parameters of the at least two cameras, wherein, the at least two cameras has at least two focal lengths;
controlling the target camera to photograph an image of the target object; and
obtaining the image photographed by the target camera, and performing recognition on the image to recognize the target object;
wherein, selecting the target camera matched with the target object from the at least two cameras according to position information of the target object in the map and photographing parameters of the at least two cameras comprises:
determining a projection position of the target object in an imaging plane of each camera based on the position information of the target object in the map and the photographing parameters of the at least two cameras, and determining the target camera, wherein the projection position of the target object locates in a photographing range of the imaging plane of the target camera;
wherein, determining the projection position of the target object in the imaging plane of each camera based on the position information of the target object in the map and the photographing parameters of the at least two cameras and determining the target camera comprise:
selecting a camera as a current camera to be selected according to an ascending order of the focal lengths of the at least two cameras successively;
determining a projection position of the target object in an imaging plane of the current camera to be selected based on the position information of the target object in the map and a photographing parameter of the current camera to be selected; and in response to determining that the projection position of the target object locates in the photographing range of the imaging plane of the current camera to be selected, determining the current camera to be selected as the target camera.

10. The vehicle according to claim 9, wherein, after determining the current camera to be selected as the target camera, the method further comprises: stopping determination operation of the target camera.

11. The vehicle according to claim 9, wherein, the photographing parameters comprises:

an internal parameter, comprising: the focal length, an optical center, and a distortion coefficient; and an external parameter, comprising: a transformation matrix from a world coordinate system to a camera coordinate system.

12. The vehicle according to claim 9, wherein before selecting the target camera matched with the target object from the at least two cameras, the method further comprises:

obtaining a position of a vehicle, wherein, the at least two cameras are installed on the vehicle; and in response to determining that the vehicle locates at a crossroad according to the position of the vehicle, obtaining three-dimensional position information of a signal light at the crossroad from map data as the position information of the target object.

* * * * *